United States Patent
Chandra et al.

(10) Patent No.: US 7,515,548 B2
(45) Date of Patent: Apr. 7, 2009

(54) END-POINT BASED APPROACH FOR DETERMINING NETWORK STATUS IN A WIRELESS LOCAL AREA NETWORK

(75) Inventors: Praphul Chandra, Germantown, MD (US); David Lide, Rockville, MD (US); Manoj Sindhwani, Oak Hill, VA (US)

(73) Assignee: Texas Instruments Incorporated, Dallas, TX (US)

( * ) Notice: Subject to any disclaimer, the term of this patent is extended or adjusted under 35 U.S.C. 154(b) by 619 days.

(21) Appl. No.: 10/951,945

(22) Filed: Sep. 28, 2004

(65) Prior Publication Data

US 2006/0067226 A1    Mar. 30, 2006

(51) Int. Cl.
    *G01R 31/08* (2006.01)
(52) U.S. Cl. .................. 370/252; 370/328; 370/395.21; 455/226.1; 455/115.2; 455/115.3; 455/436; 455/67.14; 455/67.13
(58) Field of Classification Search .................. 370/328, 370/395.21, 252; 455/226.1, 115.2, 115.3, 455/226.2, 226.3, 436, 67.14, 67.3
    See application file for complete search history.

(56) References Cited

U.S. PATENT DOCUMENTS

| | | | | |
|---|---|---|---|---|
| 5,963,551 | A * | 10/1999 | Minko ........................ | 370/356 |
| 6,137,994 | A * | 10/2000 | Alterman et al. .............. | 455/69 |
| 6,591,382 | B1 | 7/2003 | Molloy et al. | |
| 6,704,301 | B2 * | 3/2004 | Chari et al. .................. | 370/351 |
| 6,967,944 | B2 * | 11/2005 | Choi .......................... | 370/348 |
| 7,136,638 | B2 * | 11/2006 | Wacker et al. .............. | 455/424 |
| 7,143,320 | B2 * | 11/2006 | Cavin ......................... | 714/704 |
| 7,200,374 | B1 * | 4/2007 | Stephens ..................... | 455/254 |
| 7,224,697 | B2 * | 5/2007 | Banerjea et al. ............. | 370/401 |
| 2002/0136268 | A1 | 9/2002 | Gan et al. | |
| 2003/0100308 | A1 | 5/2003 | Rusch | |
| 2004/0097230 | A1 * | 5/2004 | Natarajan et al. ........... | 455/436 |
| 2004/0218575 | A1 * | 11/2004 | Ibe et al. ..................... | 370/338 |
| 2004/0246922 | A1 * | 12/2004 | Ruan et al. .................. | 370/331 |

(Continued)

FOREIGN PATENT DOCUMENTS

WO    WO 03/090037    10/2003

OTHER PUBLICATIONS

Ratish J. Punnoose, Experimental Results for Interference between Bluetooth and IEEE 802.11b DSSS System, IEEE, 2001.*

(Continued)

*Primary Examiner*—Ricky Ngo
*Assistant Examiner*—Kibrom T Hailu
(74) *Attorney, Agent, or Firm*—Steven A. Shaw; W. James Brady; Frederick J. Telecky, Jr.

(57) ABSTRACT

Determining the reasons for packet loss in a wireless local area network; such as an IEEE 802.11 network. The method uses the strength of received signals at a wireless station, such as the received signal strength indicator (RSSI), noise levels (e.g, non-802.11 energy in the 2.4 GHz frequency range), and packet loss information together to determine the network status. In most implementations, the 802.11 implementation (e.g., the 802.11 driver) is responsible for maintaining statistics on the RSSI and the noise whereas the measure of the packet loss is the responsibility of the application. The network status is determined by the endpoint station independent from the access point.

18 Claims, 3 Drawing Sheets

U.S. PATENT DOCUMENTS

2005/0070275 A1* 3/2005 Jeyaseelan et al. ....... 455/432.1
2005/0239497 A1* 10/2005 Bahl et al. ............... 455/552.1
2006/0013172 A1* 1/2006 Ruuska et al. ............. 370/338
2006/0045011 A1* 3/2006 Aghvami et al . ........... 370/230

OTHER PUBLICATIONS

Office Communication mailed on Jan. 13, 2006 issued from European Patent Office for the related application No. 05108978.7-2416.

* cited by examiner

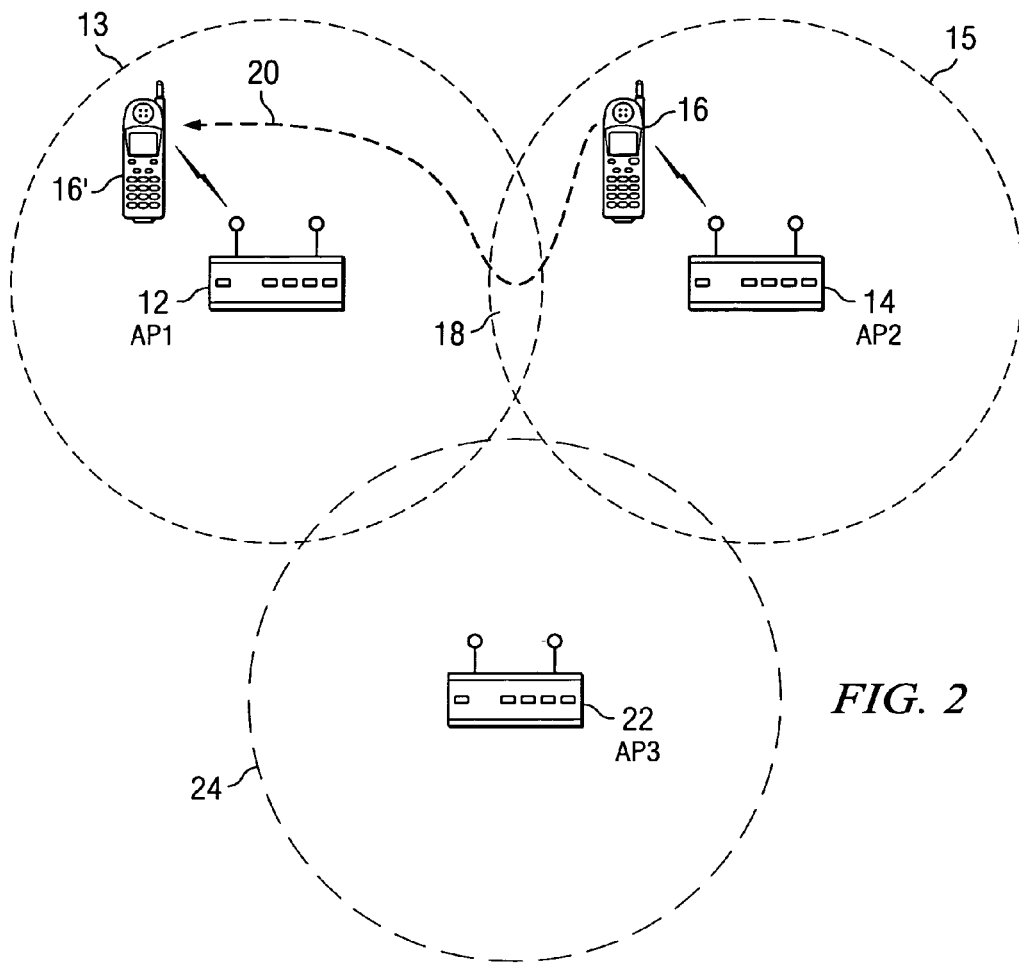

*FIG. 2*

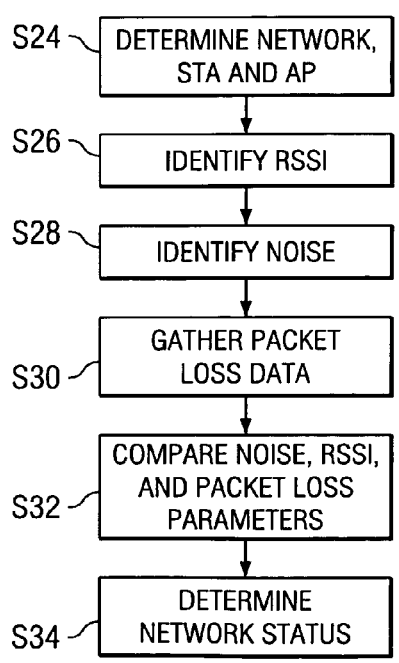

*FIG. 3*

- S24 — DETERMINE NETWORK, STA AND AP
- S26 — IDENTIFY RSSI
- S28 — IDENTIFY NOISE
- S30 — GATHER PACKET LOSS DATA
- S32 — COMPARE NOISE, RSSI, AND PACKET LOSS PARAMETERS
- S34 — DETERMINE NETWORK STATUS

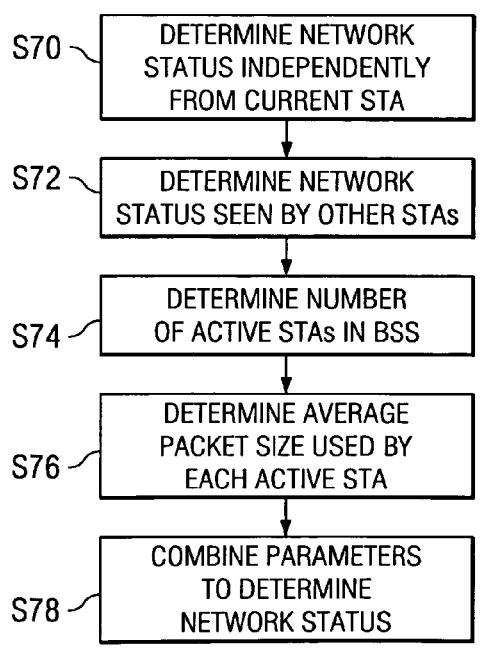

*FIG. 6*

- S70 — DETERMINE NETWORK STATUS INDEPENDENTLY FROM CURRENT STA
- S72 — DETERMINE NETWORK STATUS SEEN BY OTHER STAs
- S74 — DETERMINE NUMBER OF ACTIVE STAs IN BSS
- S76 — DETERMINE AVERAGE PACKET SIZE USED BY EACH ACTIVE STA
- S78 — COMBINE PARAMETERS TO DETERMINE NETWORK STATUS

END-POINT BASED APPROACH FOR DETERMINING NETWORK STATUS IN A WIRELESS LOCAL AREA NETWORK

CROSS-REFERENCE TO RELATED APPLICATIONS

None

FIELD OF THE INVENTION

The present invention relates generally to improving performance in a wireless local area network, and more specifically using packet loss indicators, noise indicators, and the received signal strength indicator to determine network status.

BACKGROUND OF THE INVENTION

WLANs (Wireless Local Area Networks) utilize RF (Radio Frequency) signals or light signals to connect mobile endpoints to each other or to a centralized gateway and transmit data over a wireless medium between the physical endpoints or between a mobile endpoint and an endpoint on a network that is connected to the WLAN. In 1997 the IEEE published standards for WLANs under the title of 802.11 (also known as "Wi-Fi"). The IEEE 802.11b protocol has gained popularity over the past few years and deployment of 802.11b networks is expected to increase significantly in the near future. Currently, most of these networks are used for data access from laptop computers and personal digital assistants (PDAs). The basic hardware setup of an IEEE 802.11 network is the Basic Service Set (BSS), which is merely a number of endpoint stations that communicate with one another. And ESS is larger than a BSS and can be a combination of BSSs or a BSS and other associated network nodes, components, and LAN lines. Using a WLAN to place voice phone calls using VoIP (Voice over Internet Protocols) over WLAN is also expected to grow significantly in the near future. However, VoIP over WLAN presents a unique set of problems that must be addressed prior implementing this technology.

There exists a plurality of 802.11 standards that each use different frequency bands and have varying data transmission speeds. The original IEEE 802.11 standard supported wireless interfaces operating at speeds of up to 2 megabyte per second (Mbps) in the 2.4 GHz radio band. By using different modulation techniques, IEEE 802.11b raised the data transmission rates to 11 Mbps, while 802.11a supports up to 54 Mbps transmission rates at a 5 GHz frequency. The IEEE 802.11g is developing a standard for data transmission rates of 54 Mbps at the 2.4 GHz frequency.

WLANs under 802.11 use media access control (MAC) protocols to transmit between wired and wireless devices. Each wireless network card is assigned a MAC address used to identify the station. In a BSS, IEEE 802.11 enables wireless mobile stations (STAs) to communicate through a wireless network interface directly with each other or with other stations through an access point. An access point (AP) is a centralized gateway providing message and power management and access to an external LAN (Local Area Network) and/or the Internet.

The access to wireless networks is controlled by coordination functions. The distributed coordination function (DCF) provides access similar to Ethernet CSMA/CA access. The DCF determines if the RF link between devices is clear prior to transmitting. Stations use a random backoff after every frame to avoid collisions. Endpoint stations provide MAC Service Data Units (MSDUs) after detecting no current transmissions. The MSDUs functions to transmit data frames to the proper endpoint station.

FIG. 1 illustrates a schematic diagram of an exemplary WLAN enterprise network under IEEE 802.11 protocols. One basic service set (BSS) has a wireless access point (AP1) 12 and a second BSS has a wireless access point (AP2) 14. An AP bridges data with wireless STAs that are associated with that AP. An enterprise network typically has multiple BSSs and multiple APs distributed throughout an office complex or among floors on buildings so that a STA may be operated from nearly anywhere in a complex or building. Each AP in a BSS has an RF propagation broadcast area that has an effective range based upon broadcast power, natural signal attenuation, and interferences. AP1 12 has an RF propagation area defined exemplarily by coverage ring 13, and AP2 14 has an RF propagation area defined exemplarily by coverage ring 15. A WLAN may also be used to send voice data signals using a WIPP (Wireless Internet Protocol Phone or IP Phone) 16 that transmits data signals using voice protocols, such as voice over Internet Protocol (VoIP). Notebook computer 18 is associated with AP1 12 using a wireless network interface card and transmits data using IEEE 802.11 protocols. Both APs 12,14 are connected to an internal corporate Intranet 20. The Internet 26 may be accessed through intranet 20 and gateway 22 or alternatively through AP1 12 through a Radius authentication server 24.

The first steps in improving WLAN performance is to identify the network the STA is operating in and to determine the current network status in terms of congestion, interference and cell overlap. It is rare of APs to inform the nodes about the congestion level in the BSS. If the STA is working with an AP which supplies no network status information, it is up to the STA to determine the current congestion level of the network. A starting point is to define network congestion. A BSS is congested if the traffic generated by all STAs present in the BSS is high enough to cause significant packet loss.

Packet loss is usually a good indicator of the network status. However, packet loss in the wireless network can occur due to many reasons: congestion from other 802.11 nodes in the BSS, being far away from the AP, or due to interference with cordless phones, Bluetooth® signals, or microwaves signals, since 802.11 operates in the license-free frequency range of 2.4 GHz. A problem with prior art methods is the inability to determine reasons for packet loss.

SUMMARY

The present invention by determines the reasons for packet loss in a WLAN, such as an IEEE 802.11 LAN. This is important because corrective measures to reduce packet loss would differ in each case. If for example, the degradation in quality of connection is due to congestion from other 802.11 nodes in the BSS, nodes can collaborate to maximize the performance in the BSS. Alternatively, if the degradation in quality is due to being too far away from the AP, a switchover (e.g., handoff) to a new AP is warranted. Finally, if the packet loss is attributed to interference from non-802.11 nodes, the situation must be handled differently.

The preferred embodiment uses the received signal strength indicator (RSSI), noise (e.g, non-802.11 energy in the 2.4 GHz frequency range), and packet loss information together to determine the network status. In most implementations, the 802.11 implementation (e.g., the 802.11 driver) is responsible for maintaining statistics on the RSSI and the noise whereas the measure of the packet loss is the responsibility of the application. For real time applications like phones which use RTP (Real Time Protocol), the sequence number in the packets can be used to calculate the packets lost by the network.

BRIEF DESCRIPTION OF THE DRAWINGS

Preferred embodiments of the invention are discussed hereinafter in reference to the drawings, in which:

FIG. 2 illustrates basic service set in a wireless network;

FIG. 3 is a flowchart for determining network status in a WLAN;

FIG. 6 illustrates a flowchart of an alternative embodiment determining packet loss in a WLAN.

DETAILED DESCRIPTION OF PREFERRED EMBODIMENTS

The preferred embodiment of the present invention includes a technique and algorithm for determining the reasons for packet loss in a WLAN. One implementation of the preferred embodiment is on an IEEE (Institute of Electronic and Electrical Engineers) 802.11 WLAN. An 802.11b WLAN network is a highly dynamic environment because of the inherent dynamics of the wireless medium, low operating power of 802.11, and operation in the 2.4 GHz range. Since the 802.11b operates at low power (to save power and increase battery lifetimes), a geographically smaller BSS with multiple APs (Access Points) leads to frequent handoffs and roaming scenarios. Further, since 802.11b networks operate in the unlicenced frequency range of 2.4 GHz, it is potentially open to interference from other devices (e.g., microwaves, cordless phones, Bluetooth® WLANs).

Figure 1:
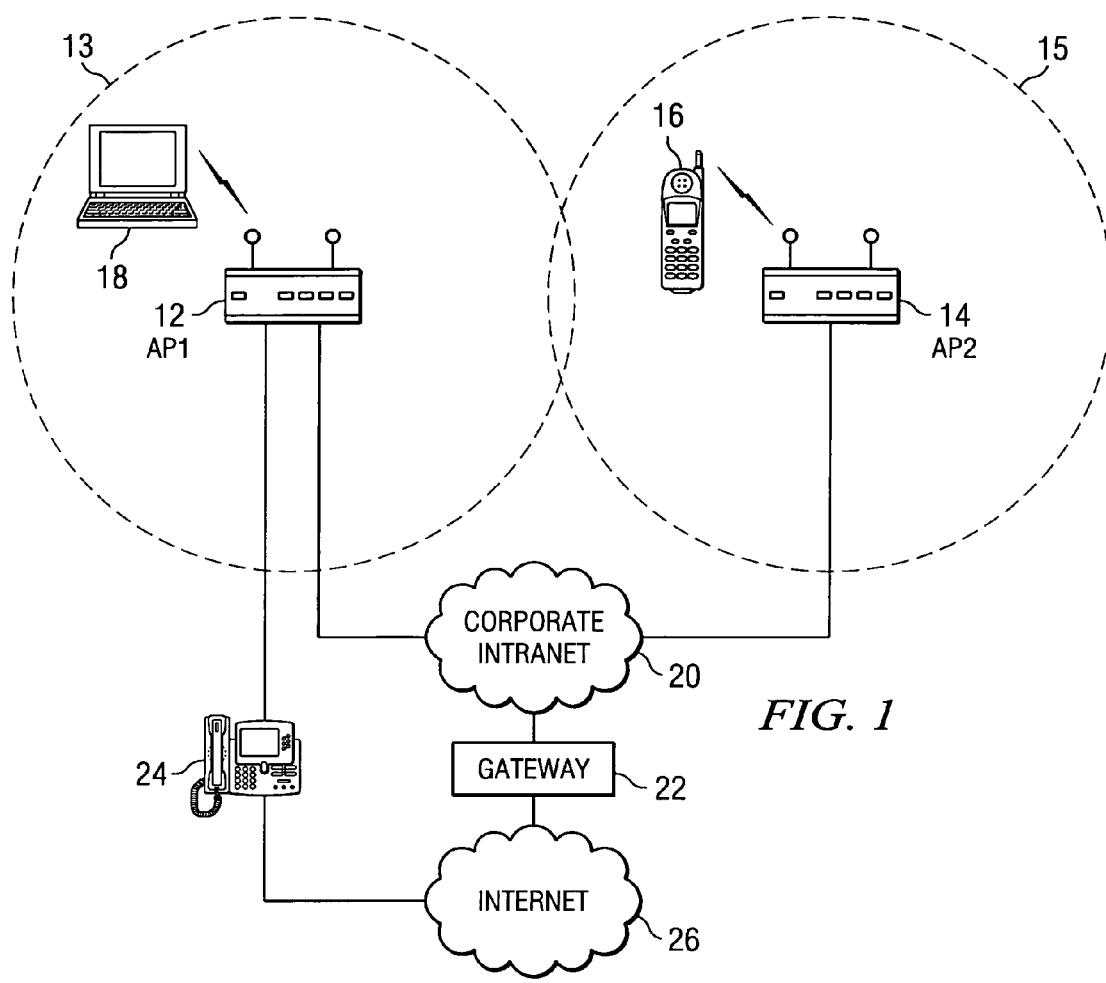
FIG. 1 illustrates an enterprise wireless local area network.

FIG. 2 illustrates a diagram of the enterprise WLAN network of FIG. 1 with WIPP (Wireless Internet Protocol Phone or IP Phone) 16 moving from the RF coverage area 15 for AP2 14 into RF coverage area 13 of AP1 12 along traverse 20. WIPP 16 can "roam" between AP1 12 and AP 2 14, allowing a user of the WIPP to move within the network coverage areas 13 and 15 without dropping its associated signal. While "roaming" is defined as the ability for a cellular phone customer to automatically make and receive calls when the cellular handset has geographically moved outside of a service provider's home network coverage area and use an alternate network operated by a different service provider, "roaming" between APs refers to a same concept to move WIPP 16 between different APs on the same or alternate networks. Enterprise-wide mobility allows affordable mobile connectivity to a large population of employees and can provide enterprise IP-PBX (IP Private Branch Exchange) features on a mobile phone such as voice mail, conferencing, transfer, and extension dialing. The BSS in FIG. 2 is completed with a third AP3 (22) having coverage area defined by coverage ring 24, which overlaps coverage areas 13 and 15.

Referring to the flowchart in FIG. 3, the preferred embodiment determines network status by identifying the network the STA of interest (STA1) is operating in and the AP that STA1 is associated with (AP1) S24. Next, identify the received signal strength indicator (RSSI) at the STA (S26). The RSSI in 802.11 networks is a measure of RF energy that is received by a wireless network interface card (NIC) from an access point. The received signal strength is measured from beacon signals that are sent out multiple times per second by an AP. It is measured as an 1-byte value from 0 up to an RSSI-Max value. As defined in 802.11, RSSI is an arbitrary integer value that is intended for use by the NIC adapter. Prior to transmitting a packet, an adapter must ensure that the transmission channel is clear. The "Clear Channel Threshold" for transmission has an RSSI value associated with it. A "Roaming Threshold" has a low RSSI and is reached by a STA when a roaming STA is associated with, but far from, an AP and the received signal level drops to a low value.

Next, determine the noise levels in the network S28. Noise is defined as non-802.11 energy in the 2.4 GHz frequency range. Finally, gather packet loss information on the network S30 and make a comparison S32 of these parameters. The preferred embodiment uses the RSSI, noise, and packet loss information together to determine the network status S34. In most implementations, the 802.11 implementation (e.g., the 802.11 driver) is responsible for maintaining statistics on the RSSI and the noise, whereas the measure of the packet loss is the responsibility of the application. If real-time applications are used in the WLAN, packets have a sequence number so that if any packets are lost, the sequence is interrupted. Thus, in a real-time application, packet loss is determined by counting the packets missing from the sequence. It is understood that in the preferred embodiment, packet loss is determined from the client, or STA, end without assistance from an AP.

Figure 4:
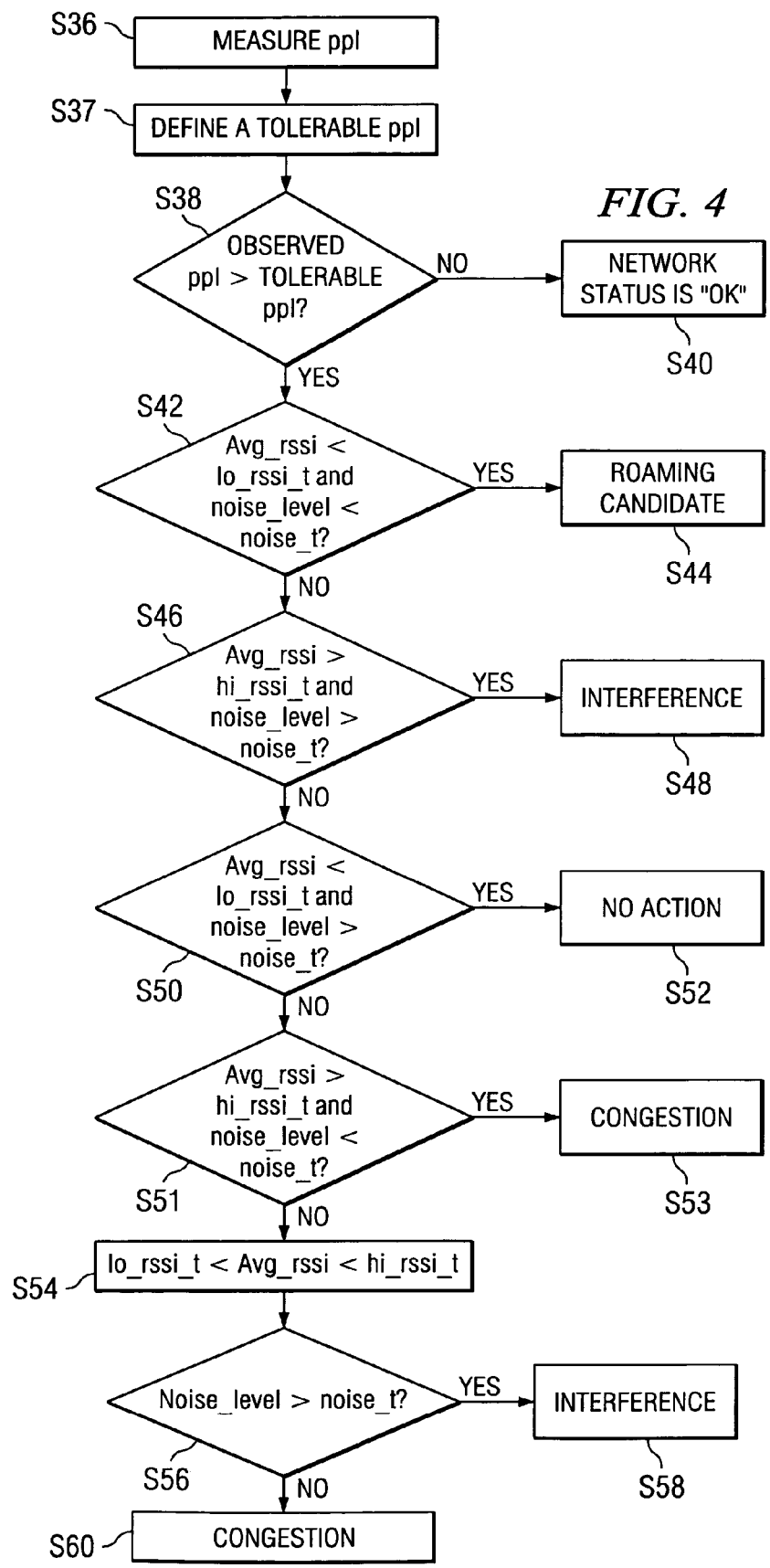
FIG. 4 is a flowchart for using RSSI and noise parameters for determining reasons for packet loss in a WLAN.

Referring contemporaneously to FIG. 4, to determine network status based on packet loss, the preferred algorithm calculates the percentage of packets lost S36 in the last x millisecond (henceforth referred to as ppl) where x is configurable depending on the needs of the application. A Tolerable ppl (Tppl) is defined as S37 a parameter wherein the application can tolerate this fraction of packet loss. This value should be a factor of the application requirements, the average signal quality, and the retry limit. If the ppl measured by the application is "low-enough" or "acceptable," network status is determined to be "OK" (NW_OK). It is understood that the qualitative terms "low-enough" and "acceptable" are relative terms which would depend on a) application requirements, and b) the retry limit being used for transmitting the packet. For example, for a real time application like voice over Internet Protocol (VOIP), tolerable ppl might be 0-10, the retry limit might be set to 2-4, and x might be 500 msec. If the observed ppl is greater than the tolerable ppl, the preferred algorithm makes comparisons between RSSI, noise, and packet loss.

For determining network status, the following terms and values are also defined. The parameter Low RSSI Threshold (lo_rssi_t) is the signal strength below which may be concluded that the STA is too far away from the STA's associated AP and needs to handoff to another AP. The value of this parameter should be maintained on a per-AP basis and should be set to the RSSI measured at roaming distance, i.e. the RSSI measured at the time when the STA switches to a new AP. The default value is as measured in the laboratory environment. The default value can be replaced by the first measurement obtained as explained above and subsequent measurements should be used to update the set value using a running average method. The value should persist across reboots of the STA.

The parameter High RSSI Threshold (hi_rssi_t) is the signal strength above which may be concluded that the STA is near enough to the AP not to cause packet loss. This would mean that a handoff to another AP is not required at that time. The value of this parameter should be maintained on a per-AP basis and should be set to a value in the range of {(highest measured rssi+lo_rssi_t)/2, lo rssi_t}. The selected value is a factor of cell overlap. A cell is defined as the RF propagation coverage area, such as defined by coverage ring 13 for AP 12 in FIG. 2. Overlap of two cells is where the coverage areas of two neighboring cells overlap one another, as illustrated by overlap area 18. For networks designed with higher overlaps between neighboring cells, choose a value nearer to (highest measured RSSI+lo_rssi t)/2 and for networks designed with smaller overlaps between neighboring cells, choose a value nearer to lo_rssi t. The wireless STA should track of the highest measured RSSI value that it receives from an AP. This value should persist across restarts/reboots of the STA.

The parameter Average RSSl(avg_rssi) is the received signal strength indicator as measured from the last N (e.g., typically 5) packets obtained from the AP.

Noise measurements in the WLAN are defined as follows. The parameter of Noise Threshold(noise_t) is the noise (e.g., non-802.11 energy) level below which measured energy is considered to be non-significant to cause any interference. Only if the observed noise power is above this value, can packet loss be attributed to noise. In the preferred embodiment, the default value should be set equal to min(−70 dBm, lo_rssi_t). The Noise Level parameter (noise_level) is the non-802.11 energy in the 2.4 GHz frequency range.

To determine the status of the network status, ppl and Tppl are used as the basic measuring tools. If ppl<Tppl, S38 then network is considered to be operating satisfactorily (reported as a "nw_ok" parameter) S40 and no further action is taken. However, if ppl>=Tppl, S38 the following scenarios are qualified to report network status.

A first status scenario includes analyzing two comparisons: the Average RSSI compared with the Low RSSI Threshold (avg rssi<lo rssi t), and the Nose Level compared with the Noise Level Threshold (noise level<noise t) S42. Low noise implies that there are no non-802.11 sources creating interference. Further, since RSSI is a measure of the distance from the AP, the low signal strength indicates that this STA is a far enough distance away from the AP such that it is a good roaming candidate S44. Ideally, this situation should not be reached if the roaming algorithm is fine-tuned enough to handoff to another AP before the RSSI falls to the low level. If, however, this scenario is reached, this can be used to provide feedback to the roaming algorithm to update its thresholds so that this scenario again may not be reached again.

A second network status scenario analyzes a combination of comparisons of the Average RSSI with the High RSSI Threshold (avg rssi>hi_rssi_t), and a Noise Level with the Noise Threshold (noise level>noise_t) S46. If the Average RSSI is greater than the High Threshold and the Noise Level is greater than the Noise Threshold, roaming due to the high signal strength is disqualified, and this is a clear indication of interference in the network S48. To further qualify the nature of interference, STA can keep a record of the number of times in the last x milliseconds that the interference problem has been encountered. This measurement may then be used to distinguish between interference and jamming. Jamming may occur in the presence of cordless phones where a STA or AP fails to transmit or receive any decipherable signals. On the other hand a Bluetooth® wireless source using FHSS has a lower probability of jamming the air interface.

If the preferred method establishes that it is suffering from interference, it should transmit this information to the rate-adaptation algorithm. This is so that rate-fall back is not attempted, since lowering the data rate is not going to improve the in the determination of network conditions. Corrective actions to handle interference may include temporary buffering by the STA to wait for a temporary interference to dissipate or stop, or increasing transmission power levels.

A third determination of WLAN status analyzes a comparison of parameters for the Average RSSI to the Low RSSI Threshold (avg_rssi<lo_rssi_t) together with a noise comparison of the Noise Level with the Noise Threshold (noise level>noise t) S50. If comparisons show that the an Average RSSI is less than the Low RSSI Threshold (avg_rssi<lo_rssi_t) and that the Noise Level is greater than the Noise Threshold (noise level>noise t), the determination of network status becomes inconclusive. This particular situation could be caused by packet loss due to interference or packet loss due to the fact that a STA is simply just far away from the AP. This data cannot be used to fine-tune the roaming algorithm since "packet loss is due to the STA being distant from the AP" cannot be concluded from this data alone.

Further, even if the packet loss is in fact being caused by interference from non-802.11 sources, switching to another AP will not help improve the packet loss condition since the noise source would still be causing interruptions in service. Therefore, this scenario is qualified as interference. When the STA finally switched to another AP (achieved by the roaming algorithm), this situation will probably be analyzed by the second network scenario as described above. Corrective measures in this scenario could be causing the STA to wait for the roaming algorithm to initiate a handoff once the handoff parameters have been met. In other words, no immediate action needs to be taken S52.

Figure 5:
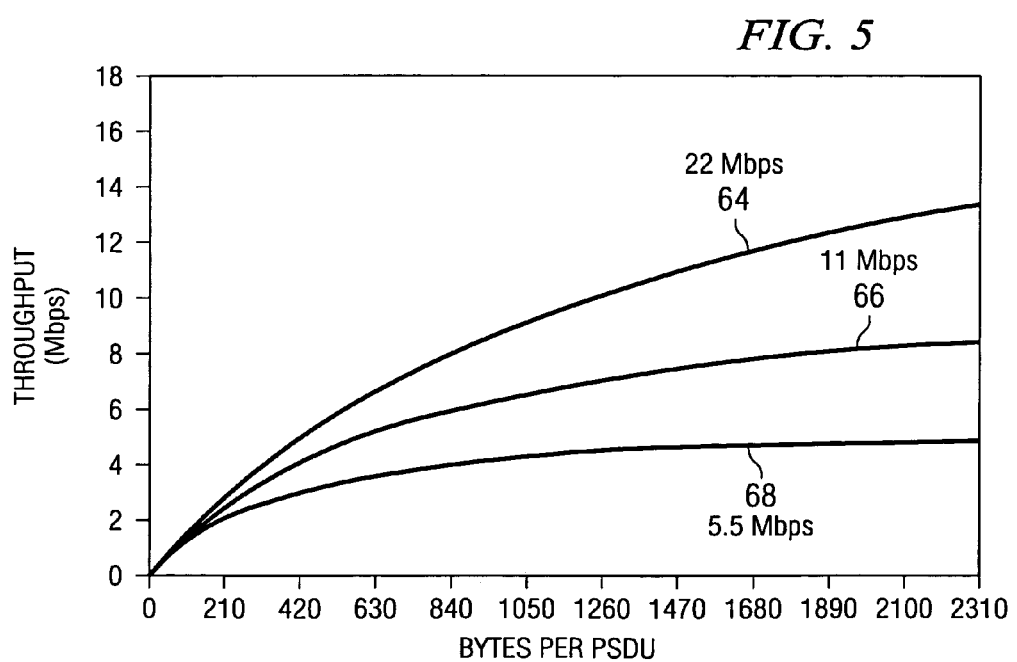
FIG. 5 illustrates theoretical throughput limits in an 802.11 network.

A fourth scenario for determining network status involves comparing the Average RSSI parameter with the High RSSI Threshold combined with comparing the Noise Level with the Noise Threshold. If the Average RSSI parameter is greater than the High RSSI Threshold, (avg_rssi>hi_rssi_t) S51 then this implies good signal strength and indicates that packet loss cannot be caused by the STA being far away from the AP. If the Noise Level is less than the Noise Threshold (noise_level<noise_t) S51, then this indicates low noise, which implies that packet loss cannot be caused by interference. Therefore, in this scenario packet loss is being caused due to congestion in the network S53. Further, congestion level in the network can be calibrated using the theoretical throughput limit. FIG. 5 shows the theoretical limits vis-à-vis the packet size for 802.11b WLANs. The throughput in Megabits per second are graphed against Bytes per Packet Size Data Unit. Graph line 64 shows theoretical limits for 22 Mbps, line 66 shows theoretical limits for 11 Mbps, and line 68 shows theoretical limits for 5.5 Mbps.

The STA may compare the observed throughput to the AP with the theoretical limit at the given transmission rate and average packet size. To perform this comparison, the criteria requires that the STA to be aware of the packet size being used by all STAs in the BSS. Determining the average packet size may not be easy to establish at all times, but typical values for packet size may be used depending on the application. For example, for VoWLAN (Voice Over WLAN) applications will have packet sizes typically in the range of 150-300 bytes. Furthermore, if all VoWLAN STAs in the BSS have a default packet size to use, this measurement will be even more accurate.

Network status can also be determined where the average RSSI measurements are between the Low and High RSSI Thresholds (lo_rssi_t, hi_rssi_t) S54 used in the prior scenarios. Since the preferred algorithm uses two thresholds for RSSI, it is possible that the Average RSSI obtained for comparisons falls in between these two thresholds. Such a scenario makes analyzing the situation even more difficult. However, since only one threshold is used for noise, the noise parameters can be used for analysis. If the Noise Level is greater than the Noise Threshold (noise_level>noise_t) S56, then the STA is probably facing interference in this scenario S58, and if the Noise Level is less than the Noise Threshold (noise level<noise_t) S56, the STA is probably facing congestion S60. Since analysis results may be inconclusive in such a scenario, the algorithm may either wait for one of the above conditions (first through fourth scenarios) to be reached or it can use the information from other STAs in the BSS as described below.

In an alternative embodiment, a STA can take into account the network status as being observed by other nodes in the BSS. To achieve the sharing of network status parameters among STAs in a BSS, each active STA periodically broadcasts its Network Status parameter (nw_status) and the average packet size parameters that each active STA has calculated. An active STA is one which is involved in a communication session. Determining the weight to give the network status information obtained from other STAs as compared each other (e.g., a weighted average) and as compared to the parameters observed by the current STA is an engineering trade-off and would depend on the set thresholds.

Using the method of the alternative embodiment illustrated in the flowchart in FIG. 6, it is understood that a current STA can use the following parameters for determining network status:

a) network status determined independently by the current station S70;
b) network status as seen by other STAs in the BSS (as a weighted average) S72;
c) number of active STAs in the BSS (to calculate the level of congestion) S74;
d) average packet-size used by each active STA (to calculate the level of congestion) S76.

Once the network status as seen by other STAs is known, this information can be combined with the current STA's observation to reach a conclusion regarding the current network status S78.

The algorithm used in the embodiments described herein preferably operates in a well-designed WLAN. One of the primary criterions for well-designed WLANs is that physically adjoining APs are well-separated in the frequency band. This assumption simplifies the network-status algorithm by implicitly ruling out the case that packet loss is due to interference from other 802.11 channels and/or BSSs. However, if physically adjoining APs are not well-separated in the frequency band, then the roaming algorithm can be modified to consider two additional measurements:

a) After a successful scan for an AP, the STA memorizes the APs that it observed during the scan and checks to see if there are any BSSs in the adjoining frequency band/channels; and
b) If there are BSSs in adjoining channels, the STA needs to keep track of the PPS (packets per second) that the STA observes in these adjoining channels.

Since wireless is inherently a broadcast medium, a STA would receive all packets that are transmitted in its vicinity. Most 802.11 implementations filter out packets which do not belong to the connected-BSS. It is however possible to record the PPS from adjoining channels. If the PPS observed in adjoining channels is significant, the packet loss may be attributable to this co-channel interference in addition to any other factors observed by the STA.

The embodiments describe an algorithm which can determine the reason of packet loss in a WLAN. Further, the present invention analyzes network status using one or more STAs instead of using data and analysis that are dependent upon AP. This has the advantage of not being restricted by a vendor's specific type of AP and protocols, or problems associated with measuring network status using different types of APs from different vendors in the same WLAN. Determining the reasons for packet loss is important because corrective measures to reduce packet loss would differ in each BSS and with each type of different STA used in the BSS. If for example, the degradation in quality of connection is due to congestion from other 802.11 nodes in this BSS, nodes can collaborate to maximize the performance in the BSS and ensure graceful degradation of service as suggested in co-pending applications Dynamic Call Parameter Switchover and Graceful Degradation for Optimizing VoIP Performance in Wireless Local Area Networks and Call Parameter Selection and Self-Enforced Admission Control for Optimizing Voice Over Internet Protocol Performance in Wireless Networks that are assigned to the same assignee as the present application.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed:

1. A method for determining network status in a wireless local area network, comprising: calculating the percentage of packets lost in signal transmissions between a wireless station and an access point in a wireless local area network; determining a reason for said lost packets by comparing at least one receive signal strength indicator (RSSI) at said wireless station with a threshold; comparing a noise level in said network with a noise level threshold; gathering network status information from a plurality of other wireless stations including at least one RSSI and noise level; applying a plurality of predetermined weightings to the network status information received from the plurality of other wireless stations respectively so that the reason for said lost packets and the at least one of the RSSI and noise level obtained at the wireless station is weighted more than the reason for said lost packets and the at least one of the RSSI and noise level received from the plurality of other wireless stations; and combining network status information analyzed from one or more of the plurality of other wireless stations in said network with said reason for lost packets from said wireless station to determine a current network status.

2. The method of claim 1, wherein said comparing the RSSI comprises comparing an average RSSI with an RSSI low threshold.

3. The method of claim 1, further comprising: determining, based on said comparing, if said station should handoff to another access point.

4. The method of claim 1, wherein said comparing the RSSI comprises comparing an average RSSI with an RSSI high threshold.

5. The method of claim 4, further comprising:
determining, based on whether said average RSSI is greater than said RSSI high threshold and whether said noise level is greater or less than said noise threshold, a reason for said lost packets.

6. The method of claim 1, wherein said comparing the RSSI comprises comparing an average RSSI with a RSSI low threshold; and
determining, based on whether said average RSSI is lower than said RSSI low threshold and whether said noise level is greater or less than said noise threshold, a reason for said lost packets.

7. The method of claim 1, wherein said comparing the RSSI further comprises:
  determining if an average RSSI calculation is between an upper and a lower RSSI threshold; and
  if said average RSSI is between said upper and said lower RSSI thresholds, using said comparing said noise level with said noise level threshold to determine said reason for said lost packets.

8. The method of claim 1, wherein said gathering network status information further comprises:
  calculating a level of congestion based on one or more active wireless stations in said wireless networks; and
  calculating a level of congestion based on an average packet size used by each said active stations.

9. A method for determining network status in a wireless local area network, comprising: calculating a packet loss in signal transmissions between a wireless station and an access point in a packet network; determining a reason for said lost packets by comparing strength of received signals at said wireless station with a threshold; comparing a noise level in said network with a noise level threshold; gathering network status information from a plurality of other wireless stations including at least one RSSI and noise level; applying a plurality of predetermined weightings to the network status information received from the plurality of other wireless stations respectively so that the reason for said lost packets and the at least one of the RSSI and noise level obtained at the wireless station is weighted more than the reason for said lost packets and the at least one of the RSSI and noise level received from the plurality of other wireless stations; and combining network status information analyzed from one or more of the plurality of other wireless stations in said network with said reason for lost packets from said wireless station to determine a current network status.

10. The method of claim 9, wherein said comparing the strength of received signals comprises comparing an average RSSI (Receive Signal Strength Indicator) at said station with an RSSI low threshold.

11. The method of claim 9, further comprising:
  determining, based on said comparing, if said station should handoff a connection to another access point.

12. The method of claim 10, wherein said comparing the RSSI comprises comparing an average RSSI with an RSSI high threshold.

13. The method of claim 12, further comprising:
  determining, based on whether said average RSSI is greater than said RSSI high threshold and whether said noise level is greater or less than said noise threshold, a reason for said lost packets.

14. The method of claim 10, wherein said comparing the RSSI comprises comparing an average RSSI with a RSSI low threshold; and
  determining, based on whether said average RSSI is lower than said RSSI low threshold and whether said noise level is greater or less than said noise threshold, a reason for said lost packets.

15. The method of claim 10, wherein said comparing the RSSI further comprises:
  determining if an average RSSI calculation is between an upper and a lower RSSI threshold; and
  if said average RSSI is between said upper and said lower RSSI thresholds, using said comparing said noise level with said noise level threshold to determine said reason for said lost packets.

16. The method of claim 9, wherein said gathering network status information further comprises: calculating a level of congestion based on one or more active wireless stations in said wireless networks; and calculating a level of congestion based on an average packet size used by each said active stations.

17. A method for determining network status in an wireless packet network including a plurality of wireless mobile stations (STAs) communicating with each other or with other STAs or subscriber devices through an access point (AP), the method comprising:
  calculating a packet loss in signal transmissions between each of the plurality of STAs and the AP;
  determining a reason for said lost packets by:
    periodically measuring a received signal strength indicator (RSSI) at the plurality of STAs based upon beacon signals periodically sent by the AP and determining an average RSSI based upon the periodically measured RSSI;
    comparing the average RSSI with an RSSI high threshold;
    comparing a noise level in said network with a noise level threshold; and
    determining, based on whether said average RSSI is greater than said RSSI high threshold and whether said noise level is greater or less than said noise threshold, a reason for said lost packets;
  periodically broadcasting from each of the plurality of STAs the determined reason for said lost packets and at least one of the measured RSSI and noise level to the others of the plurality of STAs; and
  combining the network status information received at each of the plurality of STAs from the others of the plurality of STAs via the periodic broadcasts to determine a current network status, wherein the combining of the network status information further includes applying predetermined weightings to the network status information received from the others of the plurality of STAs respectively so that the reason for said lost packets and the at least one of the measured RSSI and noise level obtained at the respective STA is weighted more than the reason for said lost packets and the at least one of the measured RSSI and noise level received from the others of the plurality of STAs.

18. The method of claim 17, further comprising: calculating a level of congestion based on one or more active wireless stations in said wireless networks; and calculating a level of congestion based on an average packet size used by each said active stations.

* * * * *